Feb. 16, 1954   H. J. HORN   2,669,487
VEHICLE WHEEL COVER
Filed June 19, 1948   2 Sheets-Sheet 1

Inventor
HARRY J. HORN
Attorneys

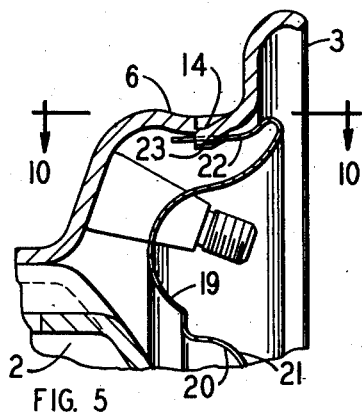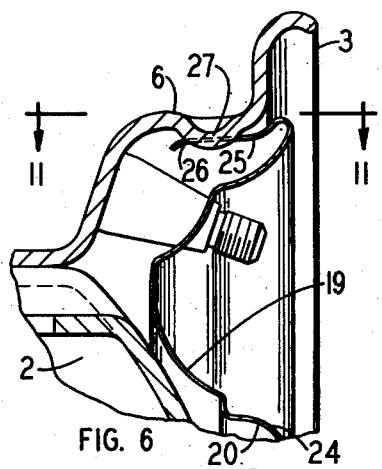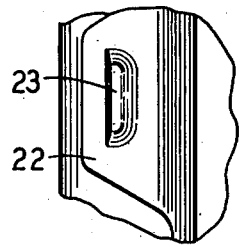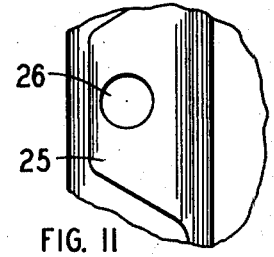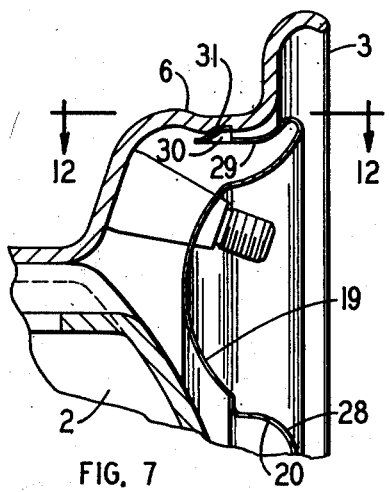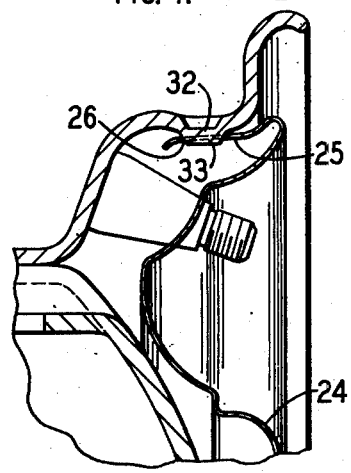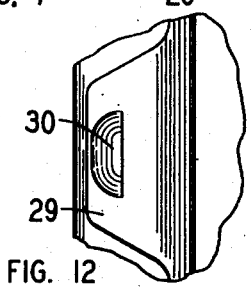

Patented Feb. 16, 1954

2,669,487

UNITED STATES PATENT OFFICE 2,669,487

VEHICLE WHEEL COVER

Harry J. Horn, Lansing, Mich., assignor to Motor Wheel Corporation, Lansing, Mich., a corporation of Michigan Application June 19, 1948, Serial No. 34,081

2 Claims. (Cl. 301—37)

This invention relates to a vehicle wheel cover.

It is old in the art to detachably mount a cover on a vehicle wheel. Since the wheel cover covers the bolts or cap screws which secure the wheel to the hub, it is necessary that the cover be detachable. The prior art is replete with snap-on type wheel covers. One of the disadvantages of detachable wheel covers now in use is that they are readily and frequently lost by disengaging themselves from the wheel during usage, particularly when the vehicle is rolling over a rough or bumpy road. Another disadvantage of the currently used snap-on type wheel cover is the expense involved in the fabrication of the spring clips which interengage the cover and in the mounting of these clips on the wheel.

This invention contemplates a detachable wheel cover which can be readily snapped into interengagement with the wheel but which cannot be disengaged from the wheel by pounding or vibration such as occurs when the vehicle is rolling over rough and bumpy highway.

The invention also contemplates a detachable cover which cannot be accidentally disengaged from the wheel but which can be very easily disengaged from the wheel by the application of the proper tool, such as a screw-driver, to the securing means.

It is also an object of this invention to produce a wheel cover which is effectively and securely interengaged with the wheel and which is relatively less expensive to fabricate and attach to the wheel than wheel covers presently in use.

Another advantage of my wheel cover is that it covers substantially the entire outer face of the vehicle wheel and that it is resiliently mounted or floated on the wheel rim so that it will not cause a metallic rattle or pound at any time, and particularly when the vehicle is rolling over the highway.

Figs. 5, 6, 7 and 8 are sectional views similar to Fig. 4 but showing modified forms of my cover and the mounting therefor on the wheel rim.

Figure 4:
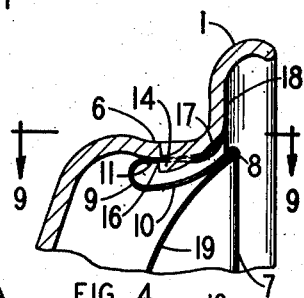
Fig. 4 is a section along the line 4—4 of Fig. 3 with the cover on the wheel.
Figure 9:
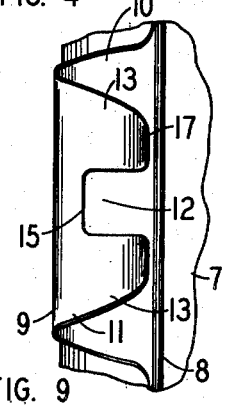

Figs. 9, 10, 11 and 12 are views taken along the lines 9—9, 10—10, 11—11 and 12—12 of Figs. 4, 5, 6 and 7 respectively but showing only a fragment of the cover and integral tab.

Referring more particularly to the drawings, I have shown a metal wheel comprising a rim 1, a stamped metal wheel body 2 provided with integral spokes 3 which are secured by rivets 4 to rim 1. Rim 1 is a conventional rim provided with seats 5 and 6 for the beads of the rubber tire which is mounted on the wheel. My cover is designated 7 and takes the form of a dished thin metal stamping provided with a narrow circumferential bead 8.

Cover 7 is provided with four tabs 9 positioned equi-distant from each other on the circumference of cover 7. Each tab 9 comprises an integral inwardly return bent portion 10 and outwardly return bent portion 11. Since the cover 7 is mounted on the outside of the wheel, as used herein "inwardly" means in a direction from the concave face of the cover toward the wheel body 2 whereas "outwardly" means in a direction from the wheel body toward the cover 7. The outwardly return bent portion 11 is bifurcated to provide recess 12 and fingers 13. Since cover 7 is made from sheet metal which has inherent spring or resilient quality, therefore each tab 9 is a spring or resilient tab. The tire seat portion 6 of the rim is provided with four projections 14 which are struck radially inwardly from seat portion 6.

To mount cover 7 upon wheel rim 1, the cover is positioned on the wheel rim with recesses 12 of tabs 9 aligned with projections 14 and the cover is pressed inwardly toward wheel body 2 whereupon tabs 9 snap over projections 14 so that fingers 13 straddle projections 14 and the inner edge 15 of tab portion 11 engages the inner edge 16 of projection 14 to releasably interlock the cover 7 on the rim. The outer ends 17 of fingers 13 turn radially outwardly and when the cover is mounted upon rim 3 they contact the outer face 18 of the tire seat portion of the rim. It should be noted that when cover 7 is mounted on the wheel that the cover is spaced from the wheel body 2 and that the four tabs 9 float cover 7 within rim 1 so that the beaded edge 8 of the cover is spaced slightly from the rim. Outwardly turned ends 17 of fingers 13 and edge portion 15 cooperate with the side face 18 of the rim and edge 16 of projection 14 to locate cover 7 within the rim so that it is out of contact with both the rim and the wheel body. Thus, the rim 3 contacts only with the outwardly return bent portion 11 of the tabs 9 and not at all with the cover 7. It should also be noted that the outer circumference portion 19 of the cover is turned outwardly which adds strength and rigidity to the cover 7. In other words, the inner portion 20 of cover 7 has a convex outer face whereas the outer circumferential portion 19 of the cover has a concave outer face.

Figure 2:
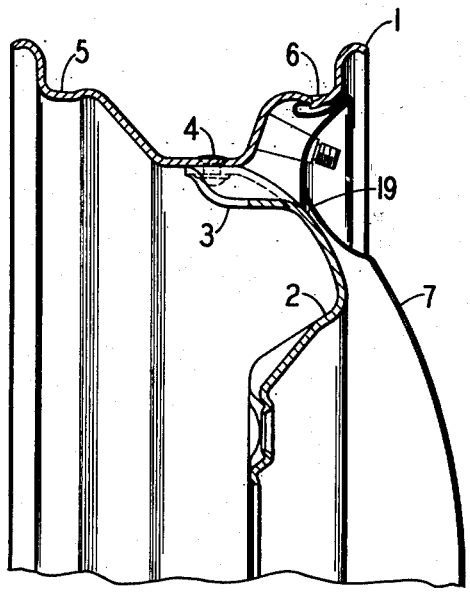
Fig. 2 is a partial section along the line 2—2 of Fig. 1.
Figure 1:
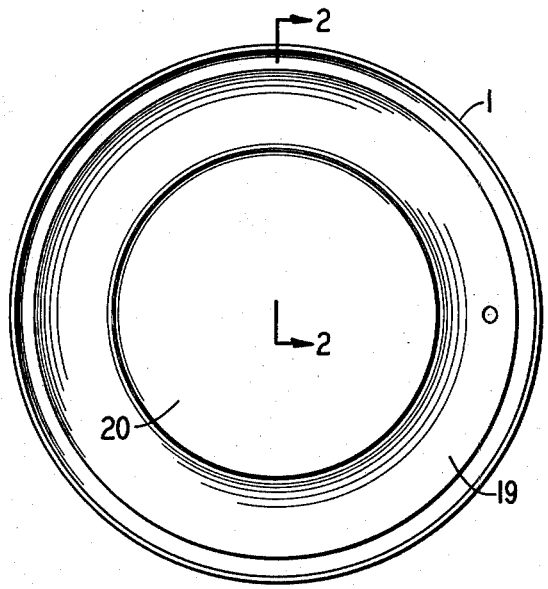
Fig. 1 is a side elevation showing my cover attached to the rim of a disc type vehicle wheel.
Figure 3:
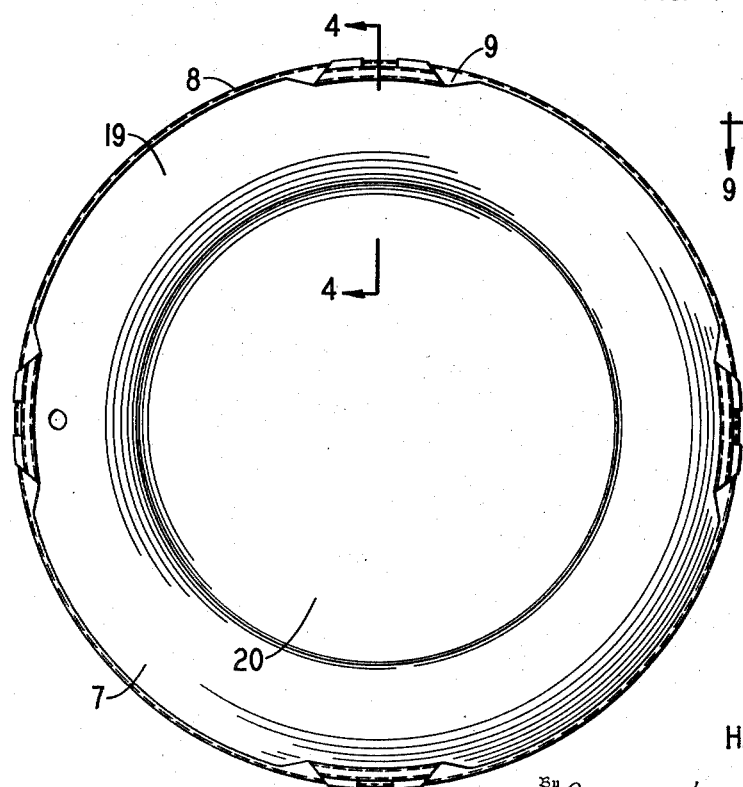
Fig. 3 is an elevation of my cover viewing the cover from the concave side.

The cover 21 shown in Fig. 5 is identical with cover 7 shown in Figs. 1 to 4 except that it is provided with four inwardly return bent tabs 22 each provided with a radially inward struck out portion or recess 23 which interengages a projection 14. Tabs 22 are integral with cover 21 and resiliently float cover 21 on the rim so that the cover is spaced both from the rim and wheel body 2.

The form of wheel cover 24, shown in Fig. 6, is substantially the same as the cover shown in the preceding figures. Cover 24 is provided with four inwardly return bent tabs 25 each provided with an opening 26 which receives a radially inwardly extending embossment or bubble 27 in the seat portion 6 of rim 3. Here again tabs 25 resiliently float cover 24 on the wheel out of contact with the rim and wheel body.

In the form shown in Fig. 7, cover 28 is substantially the same as the cover of the preceding figures. Cover 28 is provided with four inwardly return bent tabs 29 which, like tabs 25 and 22, extend in an axial direction. Each of the four tabs 29 is provided with a radially outwardly struck projection 30. Each projection 30 interlocks with a recess 31 on the inner face of seat portion 6 of the rim 3. Tabs 29 also resiliently float the cover 28 on the wheel out of contact with rim 3 and wheel body 2.

In Fig. 8, cover 24 and tabs 25 are identical with the cover and tabs shown in Fig. 6. Radial inward embossment 32 differs from embossment 27 only in that the bottom 33 of the embossment is flat rather than round.

Each of the covers herein shown can be made from a square blank of sheet metal or steel with the return bent tab portions formed in the corners of the blank. Each of these covers can be removed from the rim by inserting a small tool, such as a screw-driver between the rim and the outer face of the tab whereupon a slight tilting of the screw-driver will release the tab from its cooperating projection or recess on the rim.

As shown herein, each cover is provided with four tabs. Where the cover is provided with four tabs the release of two tabs with a screw-driver, as above described, will permit the cover to be removed from the wheel. If only three tabs are provided equally spaced about the circumference of the cover, then the release of but one tab will permit disengagement of the cover from the wheel. The use of four attaching tabs is preferred, but this number can be increased or decreased but the rim will be deformed or recessed only at the points of attachment of cover to rim.

I claim:

1. A cover for the outside face of a vehicle wheel comprising a dished sheet metal member having a plurality of integral resilient tabs each consisting of integral inwardly and outwardly return bent portions, the outwardly return bent portion of each tab being positioned radially outwardly of the inwardly return bent portion, the outwardly return bent portion of the tab being bifurcated with the bight portion of the furcation positioned axially inwardly of the outer ends of the furcation, the bifurcated tab being adapted to straddle a radially inwardly projecting portion on the wheel rim and the outer ends of the bifurcated portion of the tab being turned radially outwardly whereby they are adapted to contact the outside face of the wheel rim and co-act with the bight portion of the furcation to locate the cover on the wheel.

2. In combination a vehicle wheel comprising a wheel body and a rim fixed thereto, a plurality of radial inward projections on the rim, a sheet metal cover for the outer face of the wheel provided with at least three integral resilient tabs projecting axially from the inner face of the cover, each tab consisting of integral inwardly and outwardly return bent portions, the outwardly return bent portion of each tab being positioned radially outwardly of the inwardly return bent portion, the outwardly return bent portion of each tab being bifurcated with the bight portion of the furcation positioned axially inwardly of the outer ends of the furcation, and the outer ends of the bifurcated return bent portion of each tab being turned radially outwardly whereby the bifurcated portion of each tab is adapted to straddle a radial inward projection on the wheel rim with the outer ends of the bifurcated tab portion contacting the outside face of the rim and the bight portion contacting the projection to thereby locate and lock the cover on the wheel.

HARRY J. HORN.

References Cited in the file of this patent

UNITED STATES PATENTS

| Number | Name | Date |
| --- | --- | --- |
| 1,945,348 | Farr | Jan. 30, 1934 |
| 2,098,205 | Eskergian | Nov. 2, 1937 |
| 2,127,598 | Horn | Aug. 23, 1938 |
| 2,279,330 | Lyon | Apr. 14, 1942 |
| 2,368,228 | Lyon | Jan. 30, 1945 |
| 2,404,389 | Lyon | July 23, 1946 |
| 2,574,491 | Lyon | Nov. 13, 1951 |